United States Patent
Malik

(10) Patent No.: US 11,706,224 B2
(45) Date of Patent: Jul. 18, 2023

(54) ENTITY AUTHENTICATION FOR PRE-AUTHENTICATED LINKS

(71) Applicant: Microsoft Technology Licensing, LLC, Redmond, WA (US)

(72) Inventor: Muhammad Ali Malik, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 69 days.

(21) Appl. No.: 17/230,671

(22) Filed: Apr. 14, 2021

(65) Prior Publication Data
US 2022/0337595 A1    Oct. 20, 2022

(51) Int. Cl.
*H04L 29/06* (2006.01)
*H04L 9/40* (2022.01)

(52) U.S. Cl.
CPC ........ *H04L 63/102* (2013.01); *H04L 63/0807* (2013.01); *H04L 63/162* (2013.01)

(58) Field of Classification Search
CPC .. H04L 63/102; H04L 63/0807; H04L 63/162
See application file for complete search history.

(56) References Cited

U.S. PATENT DOCUMENTS

| | | | |
|---|---|---|---|
| 6,360,254 B1 * | 3/2002 | Linden | H04L 63/0807 707/E17.112 |
| 6,718,328 B1 | 4/2004 | Norris | |
| 7,921,450 B1 * | 4/2011 | Vainstein | H04L 63/105 726/1 |
| 8,719,912 B2 | 5/2014 | Frey et al. | |
| 11,069,016 B2 * | 7/2021 | Elder | G06Q 20/3276 |
| 2009/0328177 A1 * | 12/2009 | Frey | H04L 9/3213 726/9 |
| 2012/0331529 A1 * | 12/2012 | Ibel | H04L 9/32 726/4 |
| 2013/0185815 A1 * | 7/2013 | Leotsarakos | G06F 21/62 726/30 |

(Continued)

FOREIGN PATENT DOCUMENTS

| | | | | |
|---|---|---|---|---|
| EP | 762261 A2 * | 3/1997 | | G06F 21/31 |
| GB | 2542740 A * | 3/2017 | | H04L 63/08 |

(Continued)

OTHER PUBLICATIONS

"International Search Report & Written Opinion issued in PCT Application No. PCT/US22/021628", dated Jun. 13, 2022, 13 Pages.

(Continued)

*Primary Examiner* — Yonas A Bayou
(74) *Attorney, Agent, or Firm* — Schwegman Lundberg & Woessner, P.A.

(57) ABSTRACT

Techniques for increasing security for pre-authenticated links are disclosed herein. Computing systems that generate pre-authenticated links are configured to assign an entity identifier to pre-authenticated links to specify an entity permitted to access respective data through the pre-authenticated link. When activating a respective pre-authenticated link, an entity attaches an entity token to the request to prove an identity of the requesting entity. If the identity from the entity token matches the entity identifier, the computing system may grant access to the respective data.

20 Claims, 5 Drawing Sheets

(56) References Cited

U.S. PATENT DOCUMENTS

| | | | | |
|---|---|---|---|---|
| 2014/0040628 A1* | 2/2014 | Fort | ......................... | H04L 63/18 |
| | | | | 713/182 |
| 2014/0359299 A1* | 12/2014 | Jaundalders | .......... | H04L 9/3247 |
| | | | | 713/179 |
| 2017/0214684 A1* | 7/2017 | Gupta | ................... | H04L 63/083 |

FOREIGN PATENT DOCUMENTS

| | | | | |
|---|---|---|---|---|
| WO | WO-2013051916 A1 * | 4/2013 | ........... | H04L 9/3215 |
| WO | 2015042349 A1 | 3/2015 | | |
| WO | WO-2016013028 A1 * | 1/2016 | ............. | H04L 63/08 |
| WO | WO-2016013028 A4 * | 3/2016 | ............. | H04L 63/08 |
| WO | 2017042400 A1 | 3/2017 | | |

OTHER PUBLICATIONS

"Amazon S3 Pre-Signed URL with AWS SDK fer PHP Version 3", Retrieved from: https://docs.aws.amazon.com/sdk-for-php/v3/developer-guide/s3-presigned-url.html, Retrieved Date: January 13, 2021, 2 Pages.

"Pre-signed URLs to upload/downioad", Retrieved from: https://sirv.com/help/articles/presigned-urls/, Retrieved Date: Jan. 13, 2021, 6 Pages.

"Registering with an OAuth 2 Authorization server", Retrieved from: https://docs.alfresco.com/process-services1.8/concepts/register-OAuth.html, Retrieved Date: Jan. 13, 2021, 2 Pages.

"Using OAuth 2.0 to Access Google APIs", Retrieved from: https://developers.google.com/identity/protocols/oauth2, Retrieved Date: Jan. 13, 2021, 10 Pages.

"Using Pre-Authenticated Requests", Retrieved from: https://docs.cloud.oracle.com/en-us/iaas/Content/Object/Tasks/usingpreauthenticatedrequests.htm, Retrieved Date: Jan. 13, 2021, 4 Pages.

Jenkov, Jakob, "OAuth 2.0 Authorization", Retrieved from: https://web.archive.org/web/20190908031431/http:/tutorials.jenkov.com/oauth2/authorization.html, Sep. 8, 2019, 4 Pages.

* cited by examiner

ENTITY AUTHENTICATION FOR PRE-AUTHENTICATED LINKS

TECHNICAL FIELD

This document pertains generally, but not by way of limitation, to pre-authenticated links, and particularly but not by way of limitation to authenticating applications for pre-authenticated links.

BACKGROUND

Pre-authenticated links can be used as a call-back mechanism for clients or applications to access data from a resource service without being prompted for credentials. A resource server or other system can generate the pre-authenticated link and attach credentials with the link so that access through the link is authenticated by the resource server without the client or application needing to provide its own credentials.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods are disclosed herein for authenticating applications, users, or other entities that attempt to access data through activation of pre-authenticated links. Pre-authenticated links are used as a call back mechanism where users, applications, servicers, or other entities can access data hosted by a storage system, such as an application executing on a resource server or any other data storage service, without being prompted to provide credentials to access that data. Pre-authenticated links can be generated with a credential attached to the link such as in the form of a token. This way, the resource server or other data storage service can authenticate the request when the respective links are played back by the entity. For example, an application can execute a Hypertext Transfer Protocol (HTTP) Get call using the pre-authenticated link with the provided credential attached to access data at the location provided by the link.

A technical problem arises in that any entity that obtains the pre-authenticated link is able to access the respective data without needing to provide any credentials, which can lead malicious use of the link in the form of replay attacks, for example. A technical solution to enhance security for these pre-authenticated links includes generating the links such that the links are only accessible by the entity for which the link is generated. A technical solution includes the respective entity providing a token or other proof of identity when attempting to access the data from the resource server when activating the link. These entity specific pre-authenticated links include an entity identity as a part of the generated link. When an entity activates the respective link to access the respective data from the resource server or other storage location, the entity must prove its identity matches that of the entity identity. In an example, the entity may prove its identity using a token attached as a header when performing an HTTP Get call using the pre-authenticated link. The resource server verifies validity of the entity token and confirms the identity matches the entity identity specified by the pre-authenticated link. This has the technical effect of protecting pre-authenticated links from being activated by unknown actors. If any malicious actor obtains the link and attempts to access data using the link, the resource server can determine that the entity token is not present with the request or is invalid, for example, and reject the request, protecting the data from replay attacks.

Figure 1:
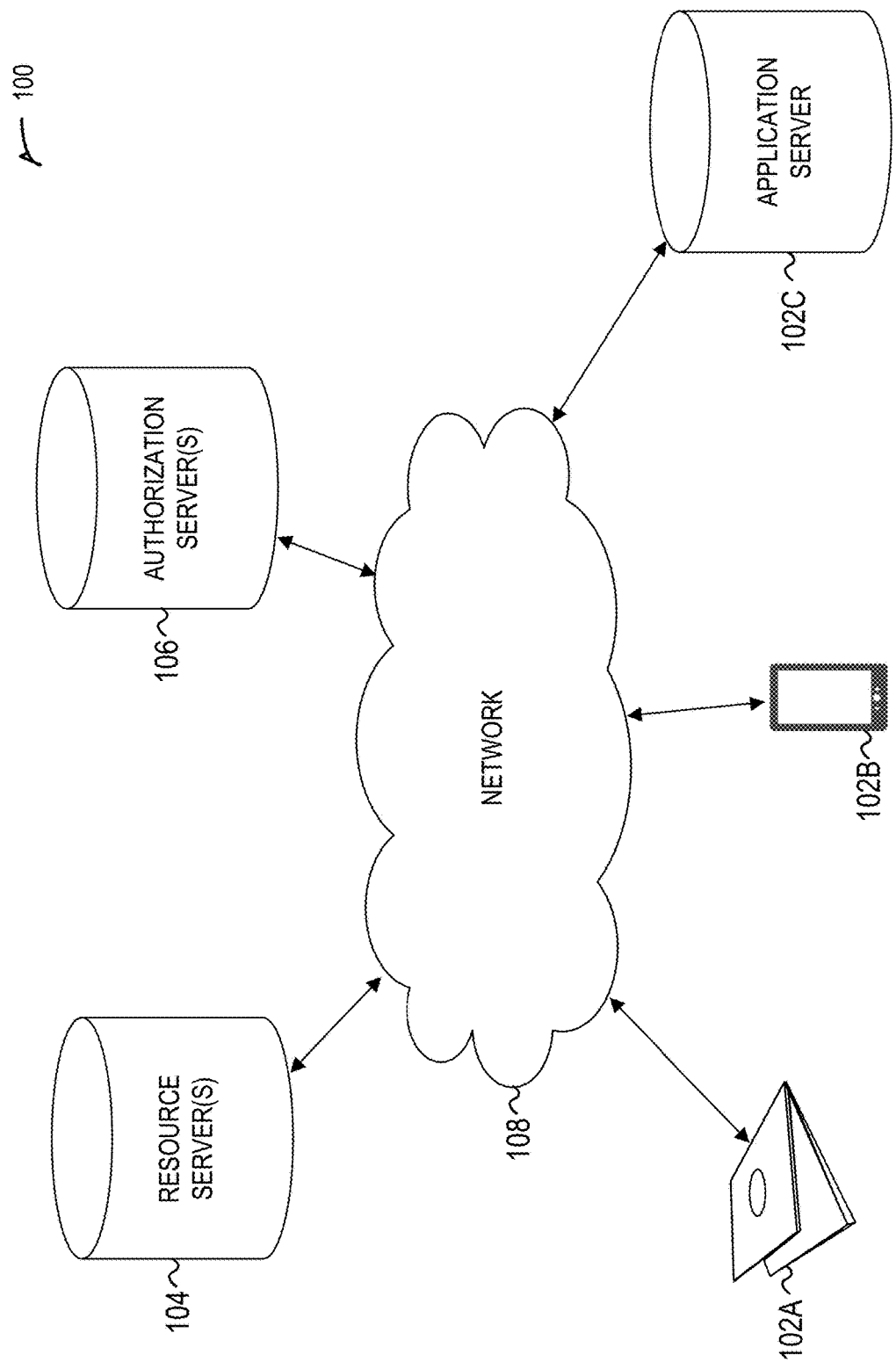
FIG. 1 is a block diagram illustrating several devices capable of executing applications that access data through pre-authenticated links.

FIG. 1 is a block diagram illustrating system 100 that includes several devices capable of executing applications that access data through pre-authenticated links. System 100 includes computing systems 102A-102C capable of executing applications that may request data through pre-authenticated links. In the example illustrated in FIG. 1, device 102A is a laptop, device 102B is a mobile phone, and device 102C is an application server. In other examples, the devices 102A-102C may also be tablets, desktop computers, wearable devices, or any other computing system capable of executing one or more application or services that request data through pre-authenticated links, either automatically, or through user request. In some examples, the data may be accessed by an application itself, though user interaction with the application, or through any other method of activating a pre-authenticated link.

The devices 102A-102C may be connected to communicate with the resource server 104 and the authentication server 106 through one or more networks 108. The networks 108 may be wired and/or wireless networks according to one or more protocols including Wi-Fi®, cellular, and the like. The resource server 104 may be one or more servers each including one or more storage devices for storing data items. The data items may be data files such as word processing documents, portable document format (PDF) files, videos, images, application files, or any other data items. The authentication server 106 may be one or more computing systems configured to execute one or more applications to perform authentication for entities attempting to access one or more data items from the resource server 104, for example.

The resource server 104 or authentication server 106 can generate pre-authenticated links that allow an application executing on one or more of the devices 102A-102C to access one or more data items stored by the resource server 104. In an example, the request for the data content using the pre-authenticated link may be made using an HTTP Get call that includes a uniform resource locator (URL) and an access token that includes a credential for authenticating the request. In an example use case, a user of one of the devices 102A-102C may identify a malicious file stored by the resource server 104. Once the malicious file is found, the resource server 104 can return a pre-authenticated link to another service to run analytics on the file. For example, the analytics server may execute on the application server 102C. Rather than granting access to the service on the application server 102C to access data in the resource server 104, the resource server 104 can provide a pre-authenticated link to the service running on the application server 102C to access that specific file. This way, the resource server 104 only grants access to applications/services to a specific data item on an as-needed basis. The application server 102C can then execute an HTTP Get call with the URL of the malicious file and an access token received with the URL from the resource server to access the malicious file. The resource server receives the request and authenticated the request using the access token.

With conventional pre-authenticated links, if an application or entity other than the intended application obtains the pre-authenticated link, a respective file can be accessed without permission, which raises security considerations, such as vulnerability to replay attacks. To account for these security considerations, the resource server 104 or authentication server 106 is configured to generate pre-authenticated links which are only accessible by the specific entity for which a respective link is generated. For example, the resource server 104 may generate a link that is only accessible by a specific application executing on the computing device 102A. This may be application specific such that only a single application executing on the computing device 102A is able to access the file. This may also be service specific such that a specific service executing on any device is able to access the file. For example, each of the devices 102A and 102B may be executing a common application. If the common application is authorized to access the data through the pre-authenticated link, the link may be activated from either device 102A or 102B. To facilitate entity-specific pre-authorized links, when accessing the data using a respective pre-authenticated link, the entity activating the link must provide its identity to prove that the application is the specified entity authorized to access the data.

To enable entity specific pre-authenticated links, the links include an entity identity as a part of the pre-authorized link, and when an entity activates the link to access respective data from the resource server 104, the entity provides a separate entity token to prove its identity. The entity token may be any item capable of identifying an identity of the entity, such as an encrypted item signed by a private key of the entity. This may be a certificate, token, or any other encrypted item. For example, the entity token may be obtained from the authorization server 106 or any other application capable of authenticating an entity for the resource server 104. After receiving an entity specific pre-authenticated link, the entity may communicate with the authorization server 106 to authenticate itself using a private key established with the authentication server, for example, to obtain the entity token. The entity token may then be used for a specified amount of time to access the data using the respective pre-authenticated link.

In some examples, the entity may prove its identity by attaching the token to a header of the request when activating the link. For example, an HTTP Get call may include the data URL, the access token that includes the provided credential for authenticating the request, and the entity token that provides proof of an identity of the entity making the request. The resource server 104 then checks the entity identity of the pre-authenticated link and verifies that identity specified in the entity token matches. This protects pre-authenticated links from being accessed by unknown or unauthorized actors. If a malicious actor obtains one of these links and tries to access data using the link, the resource server 104 verifies the link and if entity token is not present within the request or the entity token is invalid, the resource server 104 rejects the request.

To obtain a token for proving an identity of an entity, the entity may authenticate itself with the authentication server 106. For example, an application executing on the computing device 102A may authenticate itself with the authentication server 106 to receive an identity token. While described as a token, any data capable of attaching to a request to prove an identity may be used. In some examples, the authentication server 106 may be integrated with, or execute on, the same system as the resource server 104. A user or application executing on the device 102A can authenticate itself with the authentication server 106, which is a trusted server with respect to the resource server 104. Thus, the user or application executing on the application device 102A can obtain a token from the authentication server 106 for use in identifying the application when accessing resources using pre-authenticated links.

Entities may first register with the authentication server 106. For example, an application executing on the device 102B may communicate with the authentication server 106 to register itself. When registering, the authentication server 106 can assign the entity an entity ID, which may be stored in a database, lookup table, or any other storage mechanism such that the resource server 104 or authentication server 106 can reference the ID when generating a pre-authenticated link. For example, once the entity is registered, and the resource server 104 wants to generate a pre-authenticated link for the entity, the resource server 104 looks up the entity in the lookup table to obtain an entity ID for the entity. This way, the resource server can attach the entity ID to the pre-authenticated link.

The entity can obtain an entity token at the time of registration, or at any other time by authenticating with the authentication server. For example, when registering, the authentication server 106 can share or otherwise establish a private key with the entity that the entity can use to authenticate itself with the authentication server 106 at a future time in order to obtain an entity token. When the entity requests the entity token, the authentication server can lookup the entity ID and generate the entity token to include the entity ID. The token can be encrypted or otherwise signed using a private key to authenticate with the resource server 104 or the authentication server 106 when activating a pre-authenticated link.

While described as a resource server 104 and authentication server 106, any computing system that stores data may be configured to generate pre-authenticated links for the stored data. For example, a computing system that includes a database of files may be configured to generate pre-authenticated links for those files. The computing system may perform its own authentication or may communicate with an authentication server, such as the server 106. In some examples, the functions of the resource server 104, the authentication server 106, and/or the application server 102C may be performed by the same server.

Figures 2A, 2B:
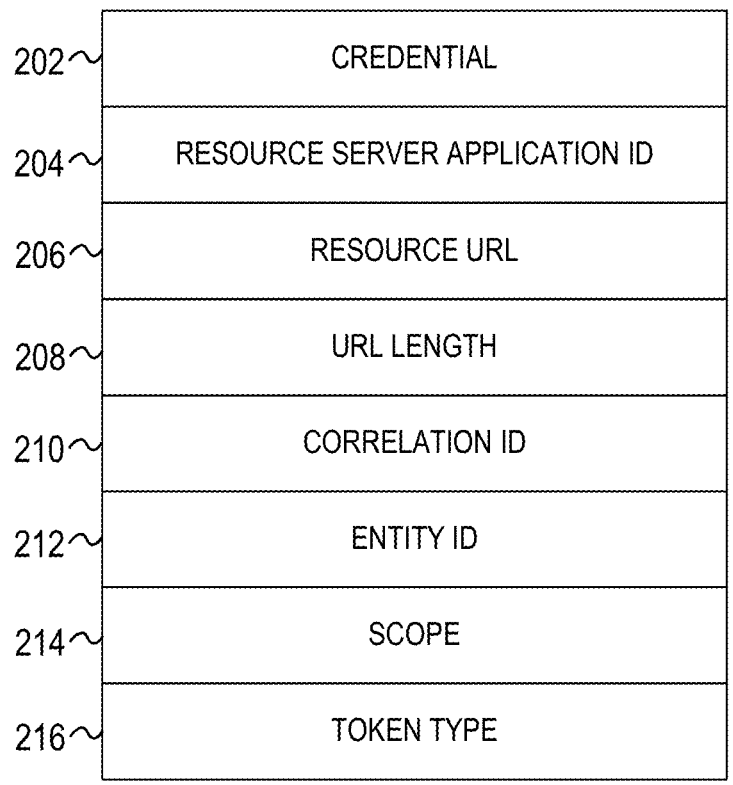
FIG. 2A is a diagram illustrating an example pre-authenticated link.
FIG. 2B is a diagram illustrating an example request using a pre-authenticated link that includes entity authentication.

FIG. 2A illustrates an example token 200 that is transmitted to an entity that includes information for an associated pre-authenticated link. The example token 200 includes a credential 202, a resource server application ID 204, a resource URL 206, a URL length 208, a correlation ID 210, an entity ID 212, a scope 214, and a token type 216. The token 200 can be generated by the resource server 104 or authentication server 106, for example, and transmitted to any of the computing devices 102A-102C for use by a user, application, or service associated with the respective computing device 102A-102C. While illustrated with the specific fields 202-216, the token 200 can include any additional or alternative fields.

For the example token 200, the credential 202 is used by the requesting party to authenticate with the resource server. The credential 202 may be encrypted using a symmetric key or asymmetric private key, for example, for use with a public key of the resource server 104 to authenticate requests made using the respective pre-authenticated link. The credential 202 may also be any other value or data item that can be used to authenticate requests with the resource server 104. The resource server application ID 204 is an identifier of the application executing on the resource server. This may be a unique identifier for the application such as a number, string, or any other identifier. For example, a database application may be executing on the resource server 104, and the resource server application ID 204 may be an identifier for the database application. The resource URL 206 is a uniform resource locator (URL) or other network address indicating a network location of the resource accessible using the respective pre-authenticated link. In some examples, the resource URL 206 may be a hash of an HTTP encoded URL. An entity associated with one of the computing systems 102A-102C can use the URL when activating the pre-authenticated link.

The URL length 208 is a value indicating a length of the resource URL which may be used to indicate, for example, if a query string parameter needs to be ignored. The correlation ID 210 can be used to identify logs, for example, that include information such as when the link was generated. The entity ID 212 is a unique identifier indicative of the application that is authorized to play back the respective pre-authorized link. The presence of the entity ID 212 can indicate to the recipient entity that the recipient needs to prove identity when activating the pre-authenticated link. The scope 214 indicates the scope granted when the respective link is played back. For example, the scope may indicate read and write permission for a respective file. The token type 216 indicates whether the respective pre-authenticated link is an entity specific pre-authenticated link. The entity may reference the token type 216 field to determine if an entity token is needed when activating the pre-authorized link.

FIG. 2B is a diagram illustrating an example pre-authenticated link 250 for an entity specific pre-authenticated link transmitted in the token 200. The request 250 may be in the form of an HTTP Get call or any other method of requesting data using a network address, such as the resource URL 206. An entity associated with one of the computing devices 102A-102C can activate the pre-authenticated link by making the request 250 that includes the resource URL 252, an access credential 254, and an entity token 256. The resource URL 252 may be the resource URL 206 specified in the token 200. The access credential 254 may be the credential 202 specified in the token 200, and the entity token 256 may be a token obtained from the authentication server 106, for example, that provides an entity identity of the requesting entity. For example, the request 250 may be in the form of "https://resource.address/data_item_[acess_token]_[entity_token]."

Figure 3:
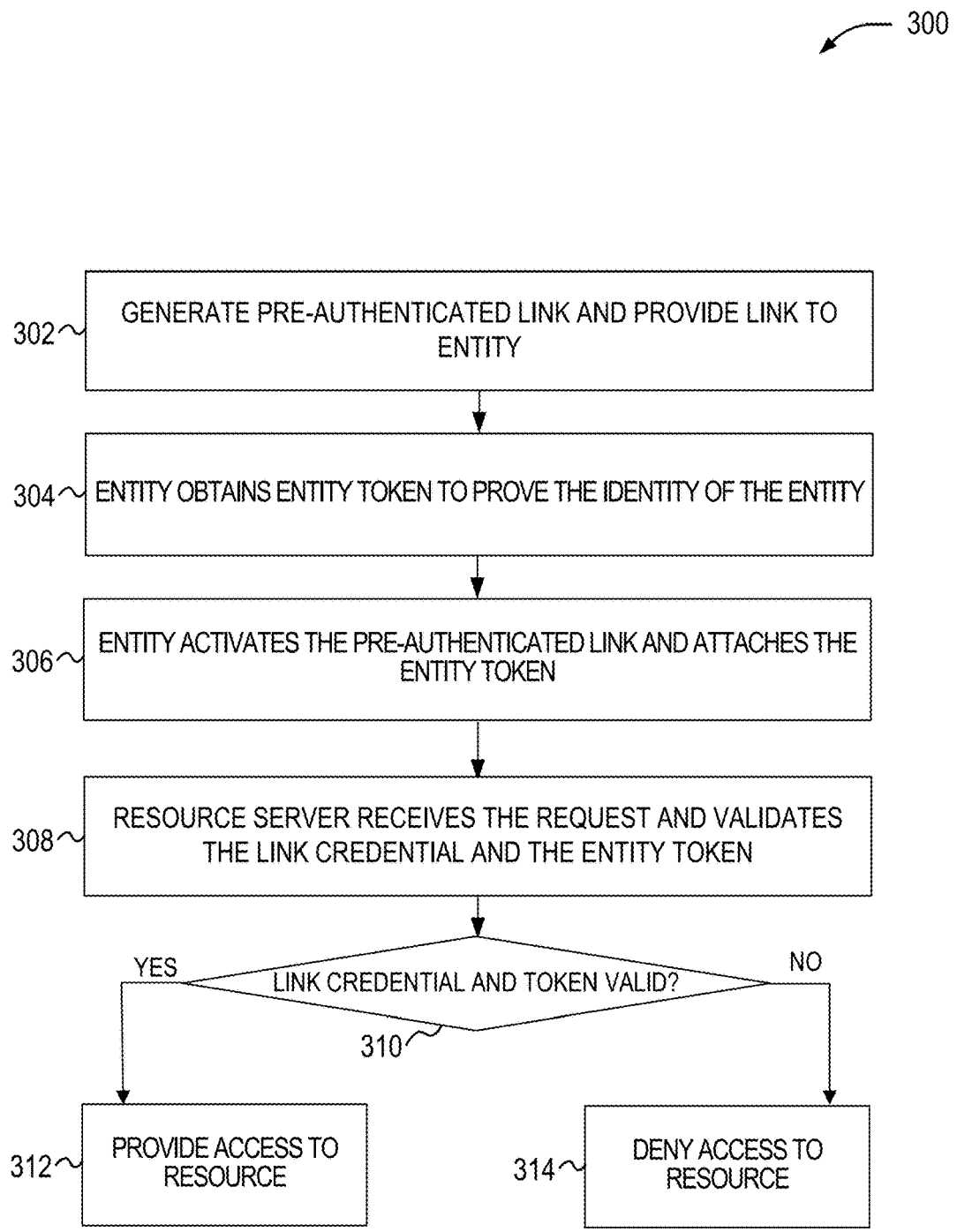
FIG. 3 is a flowchart illustrating a method of authenticating an entity that is attempting to access data through a pre-authenticated link.

FIG. 3 is a flowchart illustrating a method 300 of authenticating an entity that is attempting to access data through a pre-authenticated link. At step 302, the resource server generates a pre-authenticated link. In an example, the resource server packages the pre-authenticated link in the form of a token, such as an OAuth token, for example. The token may include a credential encrypted using a private key, for example, a resource URL, and an entity ID. The entity ID specifies an entity that is authorized to use the pre-authenticated link. For example, the entity ID may be an identifier that indicates a specific user, application, or service authorized to use the pre-authenticated link.

At step 304, the entity obtains an entity token to represent its identity when using the pre-authenticated link. To obtain a token, the entity may communicate with an authorization server associated with the resource server. The entity may have previously registered with the authorization server (FIG. 4) to obtain a corresponding entity ID. When registering, the entity may have established a credential, such as a private key, with the authentication server and may use that credential to authenticate with the authentication server to prove the entity's identity to the authorization server. In response to proving its identity, the entity receives an entity token or other encrypted identifier, for example, from the authorization server that can be used to authenticate the entity's identity when using the respective pre-authenticated link. In one example, the entity token may be an OAuth token.

At step 306, the entity activates the link, such as through making an HTTP Get call using the URL from the pre-authenticated link and attaches the credential and the entity token. In an example, the entity can attach the token obtained during step 304 to an authorization_actor header within the Get call. This header can be in any format that both the entity and the resource server understand. An example HTTP get may be "https://resource_URL/data_item?[access_credential]_[authorization_actor]."

At step 308, the resource server receives the HTTP Get call and validates the respective pre-authenticated link used to make the get call. For example, the resource server may use a public key to authenticate the attached access credential, which may have been encrypted by the resource server using a private key. For example, the entity may have obtained the access credential from the resource server when the resource server provided the pre-authenticated link to the entity. The resource server also verifies the entity token at step 308. If the token was obtained from the authentication server, for example, the resource server uses a public key from the authorization server to decrypt the token from the entity, which may have been encrypted using a private that the entity obtained through authentication with the authentication server to obtain the identity stored by the token. At step 310, the resource server verifies that the entity ID for the pre-authenticated link and the entity identity from the entity token match. If either the entity token is missing or invalid, the resource server rejects the request at step 312. If the entity ID indicated by the entity token does not match with the entity ID indicated by the pre-authenticated link, the resource server will reject the request at step 312. If the entity ID does match, and the link credentials are valid, the resource server provides access to the data at step 314.

Figure 4:
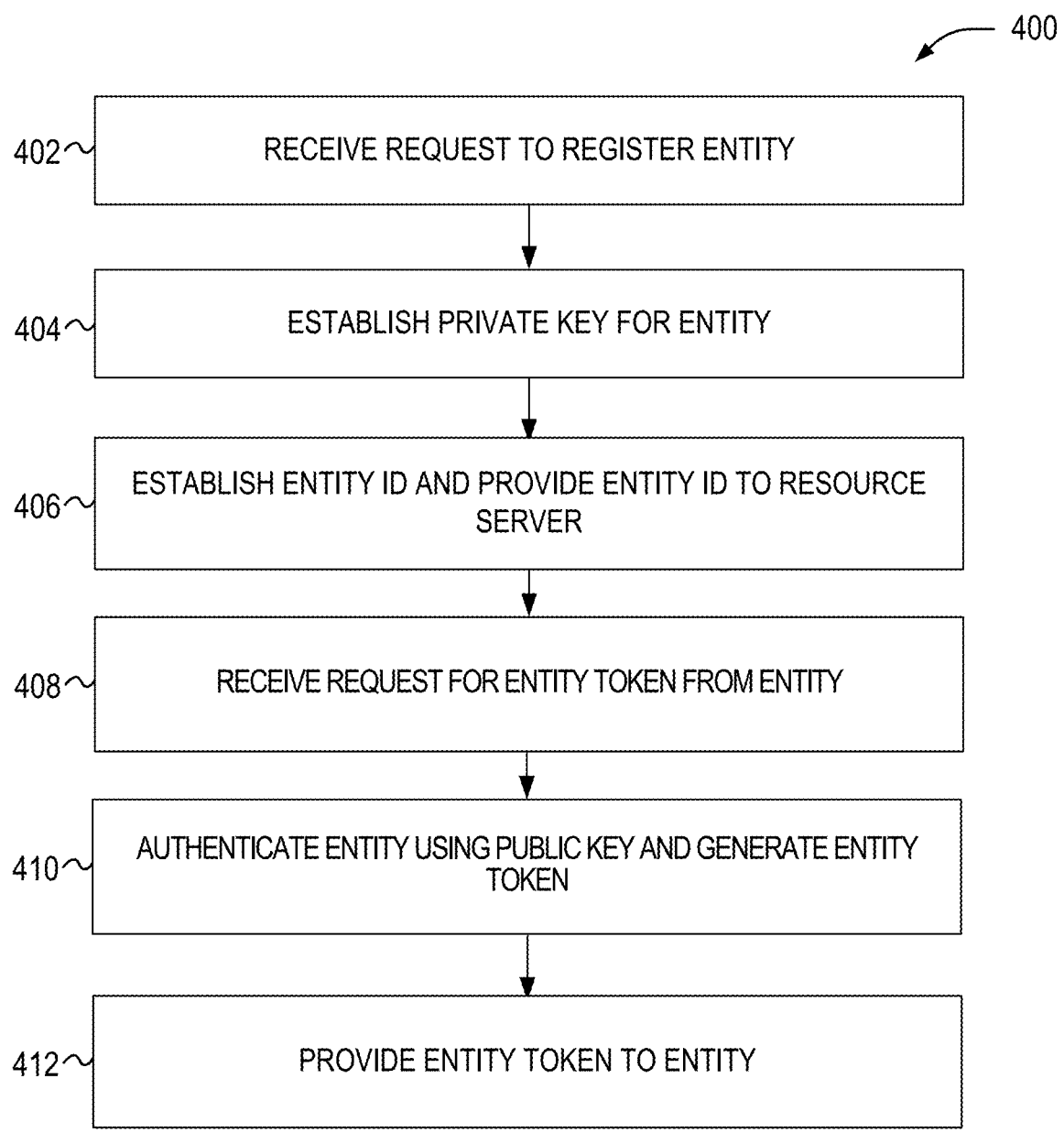
FIG. 4 is a flowchart illustrating a method of registering an entity for using entity-specific pre-authenticated links.

FIG. 4 is a flowchart illustrating a method 400 of registering an entity with an authentication server. Entities may register with an authentication server to enable the entity to receive pre-authenticated links from an associated resource server, for example. At step 402, an authentication server receives a request from an entity to register with the authorization server. This may be an entity that has a previous relationship with the authorization server and is registering to enable receipt of entity specific pre-authenticated links, or may be an entity that does not have a prior relationship with the authentication server. The entity may already have a private key to authenticate itself with the authorization server. At step 404, a private key is established for the entity. This may be a private key the entity already possesses, or may be a private key provided by the authentication server in response to the registration. At step 406, once the entity has registered with the authentication server, an entity ID can be established. This is an ID that can be used in pre-authenticated links to specify this entity as authorized to use the pre-authenticated link. This ID may be stored in a database, lookup table, or the like, and may be accessible by the resource server when generating pre-authenticated links. This way, when the resource server wishes to grant access to a file for a specific entity, the resource server can look the entity up in the lookup table and obtain the corresponding entity ID for the entity.

At step 408, the authorization receives a request from a registered entity to obtain a token for use in accessing data through a pre-authenticated link. These tokens may be valid for a specified amount of time. For example, an entity may receive a pre-authenticated link that requires an entity token. The entity may then authenticate with the authorization server to obtain a token that is usable to prove the entity's identity when accessing data using the respective link. The token may be valid for a 24 hour period, for example, allowing the entity to use the token for all HTTP Get calls for the respective link over the following 24 hour period. At step 410, the entity authenticates with the authentication server to obtain the token. To authenticate, the entity may sign a request for the token using the private key that was established at step 404. The entity provides the request for the token that was signed with the private key to the authentication server and the authentication server uses a public key, for example, to authenticate the entity. At step 412, in response to authenticating the identity of the entity, the authorization server provides the entity token to the entity for use in activating pre-authorized links for an associated resource server. This way, the entity can obtain an entity token when receiving a pre-authenticated link and use the token for each activation of the link for a specified amount of time established by the authentication server.

Figure 5:
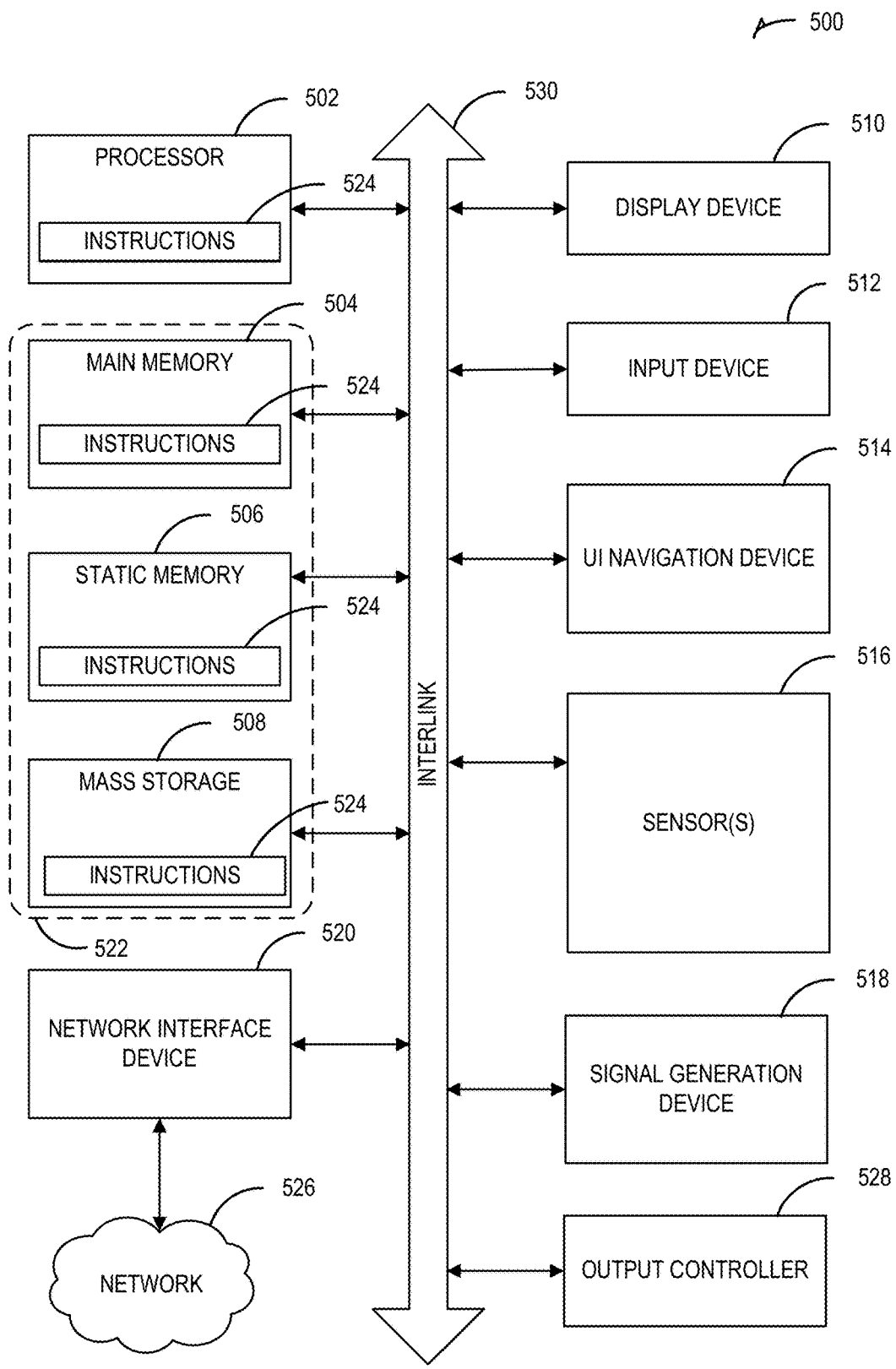
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. For example, the machine 500 can be any one or more of the servers 104, 106, or 102C, or computing devices 102A or 102B. Examples, as described herein, may include, or may operate by, logic or a number of components, or mechanisms in the machine 500. Circuitry (e.g., processing circuitry) is a collection of circuits implemented in tangible entities of the machine 500 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 500 follow.

In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 500 may include a hardware processor 502 (e.g., a central processing unit (CPU), a graphics processing unit (GPU), a hardware processor core, or any combination thereof), a main memory 504, a static memory (e.g., memory or storage for firmware, microcode, a basic-input-output (BIOS), unified extensible firmware interface (UEFI), etc.) 506, and mass storage 508 (e.g., hard drive, tape drive, flash storage, or other block devices) some or all of which may communicate with each other via an interlink (e.g., bus) 530. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 508, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 502, the main memory 504, the static memory 506, or the mass storage 508 may be, or include, a machine readable medium 522 on which is stored one or more sets of data structures or instructions 524 (e.g., software) embodying or utilized by any one or more of the techniques or functions described herein. The instructions 524 may also reside, completely or at least partially, within any of registers of the processor 502, the main memory 504, the static memory 506, or the mass storage 508 during execution thereof by the machine 500. In an example, one or any combination of the hardware processor 502, the main memory 504, the static memory 506, or the mass storage 508 may constitute the machine readable media 522. While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may be further transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software. A transmission medium is a machine readable medium.

Non-Limiting Examples

Example 1 is a method for enhancing security of pre-authenticated links for data content using one or more hardware processors, the method comprising: generating a pre-authenticated link activatable to gain access to data content stored by a computing system, wherein the pre-authenticated link includes, a network address indicating a network location of the data content, a link credential that authenticates an access request for the data content made through activation of the pre-authenticated link, and an entity identifier that identifies an entity having permission to activate the pre-authenticated link to access the data content; receiving a first request for the data content from a first requesting entity generated through activation of the pre-authenticated link; receiving the link credential associated with the first request from the first requesting entity; receiving an entity token associated with the first request, wherein the entity token indicates an authenticated identity of the first requesting entity; granting access to the data content to the first requesting entity in response to: verifying that the link credential associated with the first request is valid; and verifying that the first requesting entity is authorized to access the data content by verifying that the authenticated identity specified by the entity token matches the entity identifier for the pre-authenticated link; receiving a second request for the data content from a second requesting entity generated through activation of the pre-authenticated link; and denying access to the data content to the second requesting entity in response to a determination that the second requesting entity is not authorized to access the data content.

In Example 2, the subject matter of Example 1 includes, prior to receiving the first request for the data content: receiving, by an authentication server, a request from the first requesting entity to obtain the entity token; receiving, by the authentication server, an entity credential that authenticates the first requesting entity with the authentication server; generating, by the authentication server, the entity token for the first requesting entity in response to verifying validity of the entity credential; and transmitting the entity token to the first requesting entity.

In Example 3, the subject matter of Examples 1-2 includes, wherein the first requesting entity is associated with a user, an application, or a service.

In Example 4, the subject matter of Examples 1-3 includes, receiving a third request for the data content generated through a activation of the pre-authenticated link from a third requesting entity; and denying access to the data content in response to a determination that the link credential associated with the third request is missing or invalid.

In Example 5, the subject matter of Examples 1~4 includes, prior to receiving the first request, transmitting the pre-authenticated link to a computing device associated with the first requesting entity; receiving, by the first requesting entity at the computing device, the pre-authenticated link including the network address, the link credential, and the entity identifier; authenticating, by the first requesting entity, with an authentication server; receiving the entity token at the computing device in response to authenticating with the authentication server; and activating, at the computing device, the pre-authenticated link using the network address, the link credential, and the entity token.

In Example 6, the subject matter of Examples 1-5 includes, wherein denying access to the data content to the second requesting entity in response to the determination that the second requesting entity is not authorized to access the data content comprises detecting an absence of an entity token in the second request.

In Example 7, the subject matter of Examples 1-6 includes, wherein denying access to the data content to the second requesting entity in response to the determination that the second requesting entity is not authorized to access the data content comprises determining that an entity token received with the second request is invalid or indicates an identity of the second requesting entity that does not match the entity identifier.

In Example 8, the subject matter of Examples 1-7 includes, wherein the computing system is a resource server, and wherein generating the pre-authenticated link comprises generating the pre-authenticated link by an authorization server associated with the resource server.

Example 9 is a system for enhancing security of pre-authenticated links for data content using one or more hardware processors, the system comprising: one or more hardware processors; and one or more memories, storing instructions, which when executed, cause the one or more hardware processors to perform operations comprising: generating a pre-authenticated link activatable to gain access to data content stored by a computing system, wherein the pre-authenticated link includes, a network address indicating a network location of the data content, a link credential that authenticates an access request for the data content made through activation of the pre-authenticated link, and an entity identifier that identifies an entity having permission to activate the pre-authenticated link to access the data content; receiving a first request for the data content from a first requesting entity generated through activation of the pre-authenticated link; receiving the link credential associated with the first request from the first requesting entity; receiving an entity token associated with the first request, wherein the entity token indicates an authenticated identity of the first requesting entity; granting access to the data content to the first requesting entity in response to: verifying that the link credential associated with the first request is valid; and verifying that the first requesting entity is authorized to access the data content by verifying that the authenticated identity specified by the entity token matches the entity identifier for the pre-authenticated link; receiving a second request for the data content from a second requesting entity generated through activation of the pre-authenticated link; and denying access to the data content to the second requesting entity in response to a determination that the second requesting entity is not authorized to access the data content.

In Example 10, the subject matter of Example 9 includes, the operations further comprising: prior to receiving the first request for the data content: receiving, by an authentication server, a request from the first requesting entity to obtain the entity token; receiving, by the authentication server, an entity credential that authenticates the first requesting entity with the authentication server; generating, by the authentication server, the entity token for the first requesting entity in response to verifying validity of the entity credential; and transmitting the entity token to the first requesting entity.

In Example 11, the subject matter of Examples 9-10 includes, wherein the first requesting entity is associated with a user, an application, or a service.

In Example 12, the subject matter of Examples 9-11 includes, the operations further comprising: receiving a third request for the data content generated through a activation of the pre-authenticated link from a third requesting entity; and denying access to the data content in response to a determination that the link credential associated with the third request is missing or invalid.

In Example 13, the subject matter of Examples 9-12 includes, the operations further comprising: prior to receiving the first request, transmitting the pre-authenticated link to a computing device associated with the first requesting entity; receiving, by the first requesting entity at the computing device, the pre-authenticated link including the network address, the link credential, and the entity identifier; authenticating, by the first requesting entity, with an authentication server; receiving the entity token at the computing device in response to authenticating with the authentication server; and activating, at the computing device, the pre-authenticated link using the network address, the link credential, and the entity token.

In Example 14, the subject matter of Examples 9-13 includes, wherein denying access to the data content to the second requesting entity in response to the determination that the second requesting entity is not authorized to access the data content comprises detecting an absence of an entity token in the second request.

In Example 15, the subject matter of Examples 9-14 includes, wherein denying access to the data content to the second requesting entity in response to the determination that the second requesting entity is not authorized to access the data content comprises determining that an entity token received with the second request is invalid or indicates an identity of the second requesting entity that does not match the entity identifier.

In Example 16, the subject matter of Examples 9-15 includes, wherein the computing system is a resource server, and wherein generating the pre-authenticated link comprises generating the pre-authenticated link by an authorization server associated with the resource server.

Example 17 is a system for enhancing security of pre-authenticated links for data content using one or more hardware processors, the system comprising: means for generating a pre-authenticated link activatable to gain access to data content stored by a computing system, wherein the pre-authenticated link includes, a network address indicating a network location of the data content, a link credential that authenticates an access request for the data content made through activation of the pre-authenticated link, and an entity identifier that identifies an entity having permission to activate the pre-authenticated link to access the data content; means for receiving a first request for the data content from a first requesting entity generated through activation of the pre-authenticated link; means for receiving the link credential associated with the first request from the first requesting entity; means for receiving an entity token associated with the first request, wherein the entity token indicates an authenticated identity of the first requesting entity; means for granting access to the data content to the first requesting entity in response to: verifying that the link credential associated with the first request is valid; and verifying that the first requesting entity is authorized to access the data content by verifying that the authenticated identity specified by the entity token matches the entity identifier for the pre-authenticated link; means for receiving a second request for the data content from a second requesting entity generated through activation of the pre-authenticated link; and means for denying access to the data content to the second requesting entity in response to a determination that the second requesting entity is not authorized to access the data content.

In Example 18, the subject matter of Example 17 includes, means for transmitting the pre-authenticated link to a computing device associated with the first requesting entity prior to receiving the first request; means for receiving, by the first requesting entity at the computing device, the pre-authenticated link including the network address, the link credential, and the entity identifier; means for authenticating, by the first requesting entity, with an authentication server; means for receiving the entity token at the computing device in response to authenticating with the authentication server; and means for activating, at the computing device, the pre-authenticated link using the network address, the link credential, and the entity token.

In Example 19, the subject matter of Examples 17-18 includes, wherein the means for denying access to the data content to the second requesting entity in response to the determination that the second requesting entity is not authorized to access the data content comprises means for determining that an entity token received with the second request is invalid or indicates an identity of the second requesting entity that does not match the entity identifier.

In Example 20, the subject matter of Examples 17-19 includes, wherein the means for denying access to the data content to the second requesting entity in response to the determination that the second requesting entity is not authorized to access the data content comprises means for detecting an absence of an entity token in the second request.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for enhancing security of pre-authenticated links for data content using one or more hardware processors, the method comprising:
    generating a pre-authenticated link activatable to gain access to data content stored by a computing system, wherein the pre-authenticated link includes a network address indicating a network location of the data content, a link credential that authenticates an access request for the data content made through activation of the pre-authenticated link; and an entity identifier that identifies an entity having permission to activate the pre-authenticated link to access the data content;
    receiving a first request for the data content from a first requesting entity generated through activation of the pre-authenticated link;
    receiving the link credential associated with the first request from the first requesting entity;
    receiving an entity token associated with the first request, wherein the entity token indicates an authenticated identity of the first requesting entity;
    granting access to the data content to the first requesting entity in response to:
    verifying that the link credential associated with the first request is valid; and
    verifying that the first requesting entity is authorized to access the data content by verifying that the authenticated identity specified by the entity token matches the entity identifier for the pre-authenticated link, the entity identifier specific to the pre-authenticated link and the authenticated identity;
    receiving a second request for the data content from a second requesting entity generated through activation of the pre-authenticated link; and
    denying access to the data content to the second requesting entity in response to a determination that the second requesting entity is not authorized to access the data content.

2. The method of claim 1, further comprising:
    prior to receiving the first request for the data content:
    receiving, by an authentication server, a request from the first requesting entity to obtain the entity token;
    receiving, by the authentication server, an entity credential that authenticates the first requesting entity with the authentication server;
    generating, by the authentication server, the entity token for the first requesting entity response to verifying validity of the entity credential; and
    transmitting the entity token to the first requesting entity.

3. The method of claim 1, wherein the first requesting entity is associated with a user, an application, or a service.

4. The method of claim 1, further comprising:
receiving a third request for the data content generated through a activation of the pre-authenticated link from a third requesting entity; and
denying access to the data content in response to a determination that the link credential associated with the third request is missing or invalid.

5. The method of claim 1, further comprising:
prior to receiving the first request, transmitting the pre-authenticated link to a computing device associated with the first requesting entity;
receiving, by the first requesting entity at the computing device, the pre-authenticated link including the network address, the link credential, and the entity identifier;
authenticating, by the first requesting entity, with an authentication server;
receiving the entity token at the computing device in response to authenticating with the authentication server; and
activating, at the computing device, the pre-authenticated link using the network address, the link credential, and the entity token.

6. The method of claim 1, wherein denying access to the data content to the second requesting entity in response to the determination that the second requesting entity is not authorized to access the data content comprises detecting an absence of an entity token in the second request.

7. The method of claim 1, wherein denying access to the data content to the second requesting entity in response to the determination that the second requesting entity is not authorized to access the data content comprises determining that an entity token received with the second request is invalid or indicates an identity of the second requesting entity that does not match the entity identifier.

8. The method of claim 1, wherein the computing system is a resource server, and wherein generating the pre-authenticated link comprises generating the pre-authenticated link by an authorization server associated with the resource server.

9. A system for enhancing security of pre-authenticated links for data content using one or more hardware processors, the system comprising:
one or more hardware processors; and
one or more memories, storing instructions, which when executed, cause the one or more hardware processors to perform operations comprising:
generating a pre-authenticated link activatable to gain access to data content stored by a computing system, wherein the pre-authenticated link includes a network address indicating a network location of the data content, a link credential that authenticates an access request for the data content made through activation of the pre-authenticated link, and an entity identifier that identifies an entity having permission to activate the pre-authenticated link to access the data content;
receiving a first request for the data content from a first requesting entity generated through activation of the pre-authenticated link;
receiving the link credential associated with the first request from the first requesting entity;
receiving an entity token associated with the first request, wherein the entity token indicates an authenticated identity of the first requesting entity;
granting access to the data content to the first requesting entity in response to:
verifying that the link credential associated with the first request is valid; and
verifying that the first requesting entity is authorized to access the data content by verifying that the authenticated identity specified by the entity token matches the entity identifier for the pre-authenticated link, the entity identifier specific to the pre-authenticated link and the authenticated identity;
receiving a second request for the data content from a second requesting entity generated through activation of the pre-authenticated link; and
denying access to the data content to the second requesting entity in response to a determination that the second requesting entity is not authorized to access the data content.

10. The system of claim 9, the operations further comprising:
prior to receiving the first request for the data content:
receiving, by an authentication server, a request from the first requesting entity to obtain the entity token;
receiving, by the authentication server, an entity credential that authenticates the first requesting entity with the authentication server;
generating, by the authentication server, the entity token for the first requesting entity in response to verifying validity of the entity credential; and
transmitting the entity token to the first requesting entity.

11. The system of claim 9, wherein the first requesting entity is associated with a user, an application, or a service.

12. The system of claim 9, the operations further comprising:
receiving a third request for the data content generated through a activation of the pre-authenticated link from a third requesting entity; and
denying access to the data content in response to a determination that the link credential associated with the third request is missing or invalid.

13. The system of claim 9, the operations further comprising:
prior to receiving the first request, transmitting the pre-authenticated link to a computing device associated with the first requesting entity;
receiving, by the first requesting entity at the computing device, the pre-authenticated link including the network address, the link credential, and the entity identifier;
authenticating, by the first requesting entity, with an authentication server;
receiving the entity token at the computing device in response to authenticating with the authentication server; and
activating, at the computing device, the pre-authenticated link using the network address, the link credential, and the entity token.

14. The system of claim 9, wherein denying access to the data content to the second requesting entity in response to the determination that the second requesting entity is not authorized to access the data content comprises detecting an absence of an entity token in the second request.

15. The system of claim 9, wherein denying access to the data content to the second requesting entity in response to the determination that the second requesting entity is not authorized to access the data content comprises determining that an entity token received with the second request is invalid or indicates an identity of the second requesting entity that does not match the entity identifier.

16. The system of claim 9, wherein the computing system is a resource server, and wherein generating the pre-authenticated link comprises generating the pre-authenticated link by an authorization server associated with the resource server.

17. A system for enhancing security of pre-authenticated links for data content using one or more hardware processors, the system comprising:
- means for generating a pre-authenticated link activatable to gain access to data content stored by a computing system, wherein the pre-authenticated link includes a network address indicating a network location of the data content, a link credential that authenticates an access request for the data content made through activation of the pre-authenticated link, and an entity identifier that identifies an entity having permission to activate the pre-authenticated link to access the data content;
- means for receiving a first request for the data content from a first requesting entity generated through activation of the pre-authenticated link;
- means for receiving the link credential associated with the first request from the first requesting entity;
- means for receiving an entity token associated with the first request, wherein the entity token indicates an authenticated identity of the first requesting entity;
- means for granting access to the data content to the first requesting entity in response to:
- verifying that the link credential associated with the first request is valid; and
- verifying that the first requesting entity is authorized to access the data content by verifying that the authenticated identity specified by the entity token matches the entity identifier for the pre-authenticated link, the entity identifier specific to the pre-authenticated link and the authenticated identity;
- means for receiving a second request for the data content from a second requesting entity generated through activation of the pre-authenticated link; and
- means for denying access to the data content to the second requesting entity in response to a determination that the second requesting entity is not authorized to access the data content.

18. The system of claim 17, further comprising:
- means for transmitting the pre-authenticated link to a computing device associated with the first requesting entity prior to receiving the first request;
- means for receiving, by the first requesting entity at the computing device, the pre-authenticated link including the network address, the link credential, and the entity identifier;
- means for authenticating, by the first requesting entity, with an authentication server;
- means for receiving the entity token at the computing device in response to authenticating with the authentication server; and
- means for activating, at the computing device, the pre-authenticated link using the network address, the link credential, and the entity token.

19. The system of claim 17, wherein the means for denying access to the data content to the second requesting entity in response to the determination that the second requesting entity is not authorized to access the data content comprises means for determining that an entity token received with the second request is invalid or indicates an identity of the second requesting entity that does not match the entity identifier.

20. The system of claim 17, wherein the means for denying access to the data content to the second requesting entity in response to the determination that the second requesting entity is not authorized to access the data content comprises means for detecting an absence of an entity token in the second request.

\* \* \* \* \*